(12) United States Patent
Brindeau et al.

(10) Patent No.: US 11,293,465 B2
(45) Date of Patent: Apr. 5, 2022

(54) DOUBLE SHEAR ATTACHMENT DEVICE WITH AN ECCENTRIC AXIS AND ECCENTRIC SLEEVES, MECHANICAL ASSEMBLY INCLUDING SUCH A DEVICE AND ASSEMBLING PROCESS

(71) Applicant: AIRBUS (S.A.S.), Blagnac (FR)

(72) Inventors: Jean-Mickael Brindeau, Blagnac (FR); André Aquila, Cornebarrieu (FR); Benoit Ruscassie, Blagnac (FR)

(73) Assignee: Airbus (S.A.S.), Blagnac (FR)

( * ) Notice: Subject to any disclaimer, the term of this patent is extended or adjusted under 35 U.S.C. 154(b) by 267 days.

(21) Appl. No.: 16/569,278

(22) Filed: Sep. 12, 2019

(65) Prior Publication Data
US 2020/0088225 A1     Mar. 19, 2020

(30) Foreign Application Priority Data

Sep. 13, 2018  (FR) ..................................... 1858211

(51) Int. Cl.
*F16B 39/00*     (2006.01)
*F16B 5/06*      (2006.01)
(Continued)

(52) U.S. Cl.
CPC .......... *F16B 5/0621* (2013.01); *F16B 5/0275* (2013.01); *F16B 43/02* (2013.01)

(58) Field of Classification Search
CPC .... F16B 5/0621; F16B 5/0225; F16B 5/0275; F16B 5/025; B64C 1/18; B64C 1/26; B64C 1/061
See application file for complete search history.

(56) References Cited

U.S. PATENT DOCUMENTS 3,006,443 A * 10/1961 Siler ....................... F16B 43/00
                                                        403/408.1
4,444,365 A *  4/1984 Heuberger .............. F16C 23/10
                                                        244/48
(Continued)

FOREIGN PATENT DOCUMENTS

DE       197 19 915 A1     12/1998
DE       19719915 A1 * 12/1998 ............... B64C 1/26
(Continued)

OTHER PUBLICATIONS

French Search Report for Application No. 1858211 dated May 24, 2019.

*Primary Examiner* — Gary W Estremsky
(74) *Attorney, Agent, or Firm* — Jenkins, Wilson, Taylor & Hunt, P.A.

(57) ABSTRACT

A double shear attachment device with an eccentric axis and eccentric sleeves, mechanical assembly including such a device and assembling process. The attachment device comprises an eccentric axis and two eccentric sleeves to mount on the eccentric axis to correct, by an appropriate positioning in rotation of the eccentric sleeves on the eccentric axis, the possible clearances between superposed circular holes of mechanical components that have to be linked together by the attachment device, the attachment device including also blocking structure configured to block in rotation the eccentric sleeves, the attachment device thus allowing to generate a quick and clear attachment, that is able to correct clearances locally.

15 Claims, 4 Drawing Sheets

(51) Int. Cl.
*F16B 5/02* (2006.01)
*F16B 43/02* (2006.01)

(56) References Cited

U.S. PATENT DOCUMENTS

| | | | |
|---|---|---|---|
| 5,779,260 A | 7/1998 | Reilly et al. | |
| 7,438,492 B2* | 10/2008 | Naudet | F16C 7/06 |
| | | | 403/374.1 |
| 8,544,861 B2* | 10/2013 | Frens | B60G 15/068 |
| | | | 280/86.753 |
| 2002/0133950 A1* | 9/2002 | Bullard | F16B 43/00 |
| | | | 29/898.07 |
| 2006/0088395 A1* | 4/2006 | Booher | B60P 7/083 |
| | | | 410/103 |
| 2006/0133890 A1 | 6/2006 | Etoile et al. | |
| 2017/0045080 A1 | 2/2017 | Grether et al. | |
| 2020/0088223 A1* | 3/2020 | Brindeau | F16B 43/02 |

FOREIGN PATENT DOCUMENTS

| | | | | |
|---|---|---|---|---|
| DE | 10 2012 021102 A1 | 4/2013 | | |
| EP | 1 672 231 A1 | 6/2006 | | |
| EP | 3480110 A1 * | 5/2019 | | B64C 1/06 |
| WO | WO-2018113863 A1 * | 6/2018 | | F03D 80/00 |

* cited by examiner

DOUBLE SHEAR ATTACHMENT DEVICE WITH AN ECCENTRIC AXIS AND ECCENTRIC SLEEVES, MECHANICAL ASSEMBLY INCLUDING SUCH A DEVICE AND ASSEMBLING PROCESS

CROSS-REFERENCE TO RELATED APPLICATION

This application claims priority to French patent application FR 1858211 filed Sep. 13, 2018, the entire disclosure of which is incorporated by reference herein.

TECHNICAL FIELD

The disclosure herein relates to a connecting device intended to link together two separate mechanical components.

In the context of the disclosure herein, a first of the mechanical components is provided with a fork with two branches, each of the branches being provided with at least one circular hole, and the second of the mechanical components comprises an end provided with at least one circular hole, which is intended to be inserted into the fork.

BACKGROUND

Such a connecting device may be used in any field, notably but not exclusively aviation, requiring a structural assembly operation between two mechanical components (or structures) of this type which have a certain play.

Although not exclusively, the disclosure herein may be applied more particularly to the attachment of mechanical components on an aircraft, in particular on a transport plane, in particular to the attachment of a floor module in the fuselage of an aircraft.

To reduce the manufacturing time of an aircraft, it is envisaged to carry out operations in parallel, notably by developing modularities. To do so, modules are prefabricated and preassembled, before being incorporated in the structure of the aircraft's fuselage, late in the manufacturing process. This method of assembly may notably relate to one or more floor modules. For this purpose, each floor module may be fitted with water pipes, electrical wiring, ventilation ducts, floor panels, etc.

For effectively incorporating such a fully fitted floor module into the fuselage, the interfaces (or connection points) between the module and the fuselage must be connected as quickly as possible, with the aid of connecting devices. The attachment must also be clean and be capable of compensating for possible play. Indeed, play generally appears at the various connection points, due to imperfect geometries and/or misalignments of parts or holes.

It is advantageous to be able to have a connecting device capable of producing an assembly making it possible to compensate for play, generally a few millimeters, and this without having to perform adjustment operations or drillings to have a clean assembly in the final assembly phase, which can be carried out quickly.

SUMMARY

The disclosure herein provides a connecting device making it possible to perform a fast, clean connection capable of effectively compensating for play. To do so, it relates to a connecting device intended to link together two mechanical components, a first of the mechanical components being provided with a fork with two branches, each of the branches being provided with a circular hole, and the second of the mechanical components being provided with a circular hole.

According to the disclosure herein, the connecting device comprises at least:

an eccentric pin comprising at least first and second coaxial cylindrical sections having a first axis of revolution and, between these first and second cylindrical sections, a third cylindrical section having a second axis of revolution, the first and second axes of revolution being different, the third cylindrical section being intended to pass through the circular hole of the second mechanical component;

a first eccentric sleeve comprising at least one hollow cylinder provided with an outer cylindrical surface and an inner cylindrical surface, the outer cylindrical surface being intended to be inserted into the circular hole of one of the branches of the fork and the inner cylindrical surface being intended for receiving the first cylindrical section of the eccentric pin, the inner and outer cylindrical surfaces of the first eccentric sleeve having different axes of revolution; and a second eccentric sleeve comprising at least one hollow cylinder provided with an outer cylindrical surface and an inner cylindrical surface, the outer cylindrical surface being intended to be inserted into the circular hole of the second of the branches of the fork and the inner cylindrical surface being intended for receiving the second cylindrical section of the eccentric pin, the inner and outer cylindrical surfaces of the second eccentric sleeve having different axes of revolution.

Preferably, although not exclusively, the connecting device further comprises:

a first blocking element capable of rotationally blocking the first eccentric sleeve; and a second blocking element capable of rotationally blocking the second eccentric sleeve.

Thus, thanks to the triple eccentricity features due to the eccentric pin and the engaging eccentric sleeves (intended to be mounted on the eccentric pin), there is an adjustable tolerance between the third section of the eccentric pin (intended to be inserted into the circular hole of the second mechanical component) and the cylindrical sections comprising the outer cylindrical surface of the eccentric sleeves (intended to be inserted in the circular holes of the first mechanical component). This tolerance is adjustable by rotation of the eccentric sleeves on the eccentric pin. Thus, by suitable rotational positioning of the eccentric sleeves on the eccentric pin, it is possible to compensate for any possible play between the circular (superimposed) holes of the mechanical components to be linked together. This rotational positioning, once adjusted, is secured by the first and second blocking elements.

The connecting device thus makes it possible make a connection (or assembly) which is able to compensate for any possible play and this without having to perform adjustment operations or drillings, which makes it possible to obtain a clean connection and to quickly perform the assembly.

Advantageously, the connecting device comprises a ball joint intended to be arranged between the third cylindrical section and the circular hole of the second mechanical component.

In a preferred embodiment, the first blocking element comprises a first plate provided with a circular opening with an inner notched edge, intended to grip a complementarily shaped notched peripheral edge of the first eccentric sleeve, the first plate being capable of being attached.

In addition, in a preferred embodiment, the second blocking element comprises a second plate provided with a circular opening with an inner notched edge, intended to grip a complementarily shaped notched peripheral edge of the second eccentric sleeve, the second plate being capable of being attached.

Advantageously, the first, second and third cylindrical sections of the eccentric pin are connected directly to one another longitudinally.

Moreover, advantageously, the eccentric pin is provided, at each of its ends, with a threaded section intended to receive a nut.

The disclosure herein also relates to a mechanical assembly comprising a first mechanical component, a second mechanical component and a connecting device as described above, which connects the first and second mechanical components together.

Advantageously, the first blocking element and the second blocking element are attached onto the first mechanical component.

The disclosure herein further relates to a method of assembly of two mechanical components, with the aid of a connecting device such as that described above, a first of the mechanical components being provided with a fork having two branches, each of the branches being provided with a circular hole, and the second of the mechanical components being provided with a circular hole.

According to the disclosure herein, the method of assembly comprises steps consisting or comprising, successively, of at least:

bringing the second mechanical component so that one end thereof, provided with the circular hole, is introduced between the branches of the fork of the first mechanical component (provided with two circular holes) so as to superimpose the three circular holes;

inserting the eccentric pin and the eccentric sleeves into these superimposed circular holes and bringing them into rotationally relative positions that allow any play to be compensated for if appropriate; and rotationally blocking the eccentric sleeves and the eccentric pin, using the blocking elements.

BRIEF DESCRIPTION OF THE DRAWINGS

The appended, example figures will elucidate how the disclosure herein may be implemented. In these figures, identical references designate similar elements. More particularly.

DETAILED DESCRIPTION

Figure 1:
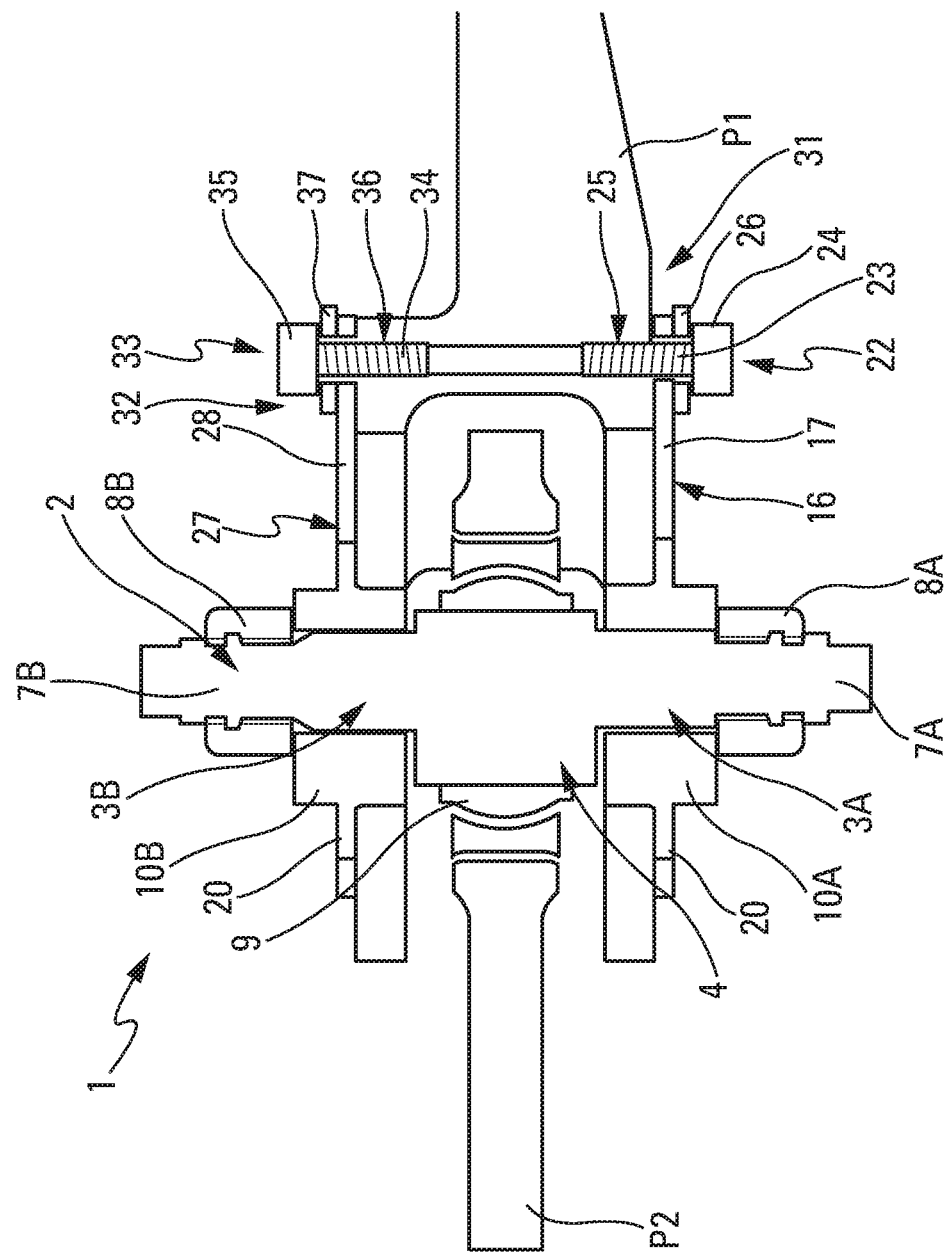
FIG. 1 is a schematic sectional view, slightly in perspective, of an embodiment of a connecting device linking together two mechanical components.

The connecting device 1, represented schematically in an embodiment in FIG. 1, is intended to make a connection between two separate mechanical components P1 and P2.

Figure 2:
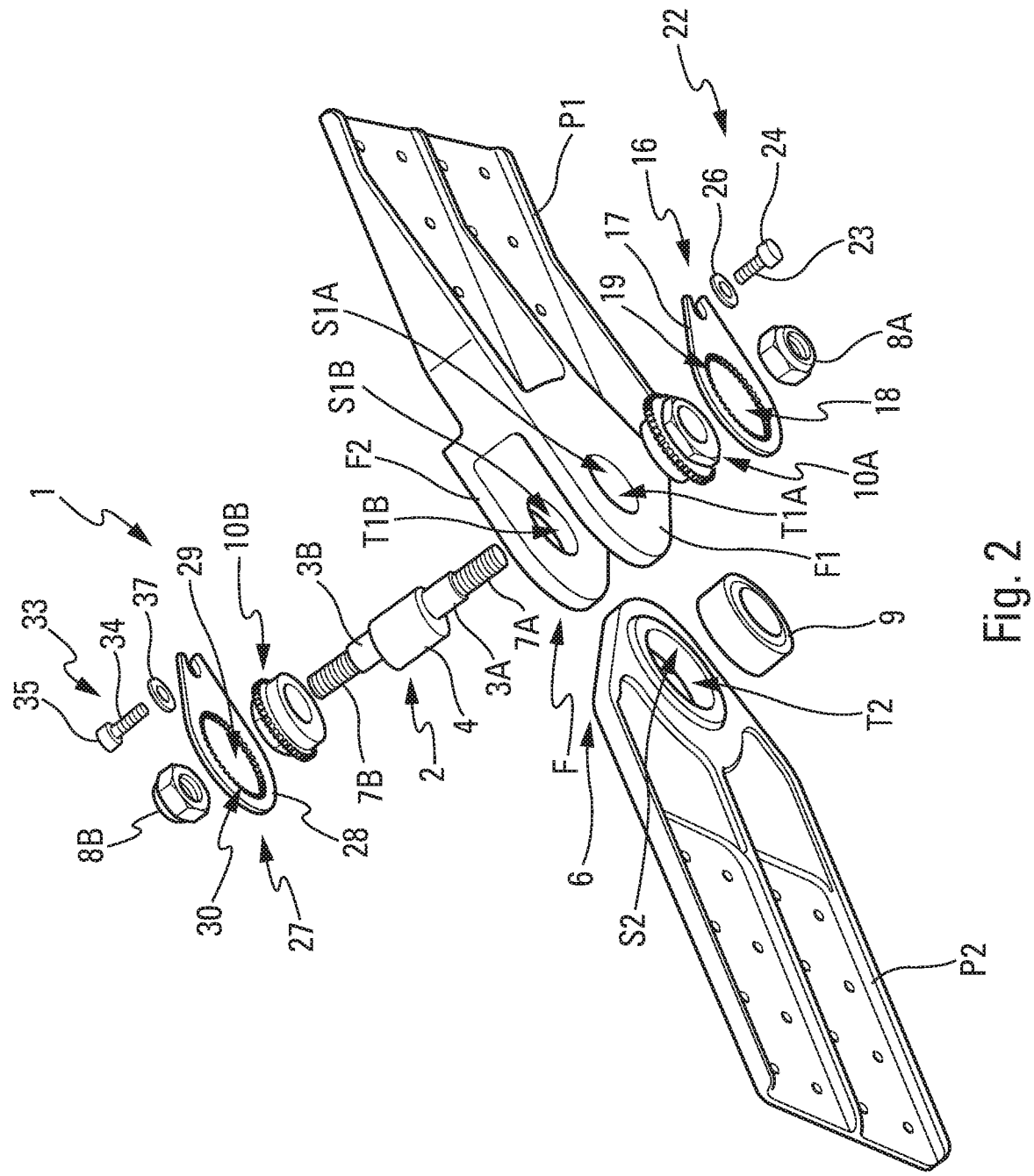
FIG. 2 is an exploded view, in perspective, of two mechanical components and various elements of a connecting device intended to link together these two mechanical components.

The mechanical component P1 comprises a fork F with two branches F1 and F2, as represented in FIG. 2. Each of the branches F1 and F2 comprises a circular hole T1A, T1B, the two circular holes T1A, T1B facing each other. The mechanical component P2 comprises a circular hole T2. For assembly, the mechanical component P2 is arranged so that one end (or portion) 6 thereof, provided with the circular hole T2, is introduced between the branches F1 and F2 of the fork F of the mechanical component P1 so as to superimpose the three circular holes T1A, T1B and T2 preferably of the same diameter, via which the connecting device 1 links together the mechanical components P1 and P2.

To do so, the connecting device 1 comprises, as represented in FIGS. 1 and 2, a solid eccentric pin 2.

Figure 3:
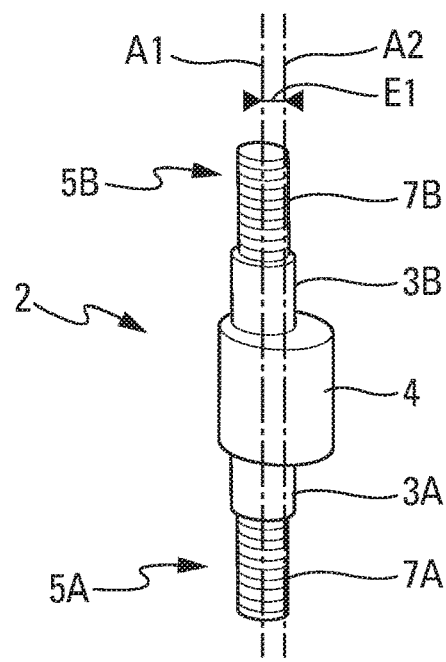
FIG. 3 is a view in perspective of an eccentric pin.

The eccentric pin 2 notably comprises, as depicted in FIG. 3:

the cylindrical sections 3A and 3B which are each made in the form of a right circular cylinder and have the same (central) axis of revolution A1; and between these cylindrical sections 3A and 3B, a cylindrical section 4 made in the form of a right circular cylinder which has a (central) axis of revolution A2.

The cylindrical sections 3A, 3B and 4 are connected directly to each other longitudinally (namely in the direction of the axes of revolution A1 and A2). The cylindrical sections 3A and 3B present substantially identical lengths along the axis of revolution A1. The cylindrical sections 3A and 3B also present substantially identical diameters with respect to the axis of revolution A1. The cylindrical sections 3A, 4 et 3B form the eccentric pin 2 which is symmetrical with respect to a plan of symmetry of the mechanical component P1.

The pin 2 is termed eccentric, since the two axes of revolution A1 and A2 are different, i.e. not coaxial, while being parallel to each other. In other words, the centers of the circular cross sections, both of the cylindrical sections 3A and 3B, and of the cylindrical section 4, are different, i.e. offset with respect to each other, as illustrated in FIG. 3 by a spacing (or offset) E1 (in a plane orthogonal to the parallel axes of revolution A1 and A2). There are therefore, on the eccentric pin 2, a first offset between the cylindrical sections 3A and 4 and a second offset between the cylindrical sections 3B and 4.

The cylindrical section 4 of the eccentric pin 2 is intended to be inserted into a circular hole of one of the mechanical components P1 and P2 to be linked together, namely in the circular hole T2 of the mechanical component P2 in the example of FIGS. 1 and 2, by being in contact with the inner surface S2 of the circular hole T2 via a ball joint 9.

This ball joint 9 is intended to be arranged between the cylindrical section 4 of the eccentric pin 2 and the circular hole T2 of the mechanical component P2. The ball joint 9 compensates some plays between the mechanical component P2 and the cylindrical section 4.

As represented in FIG. 3, the eccentric pin 2 is provided at each of its two longitudinal ends 5A and 5B, with a threaded section 7A, 7B intended to receive a nut 8A, 8B (FIG. 2).

Figure 4:
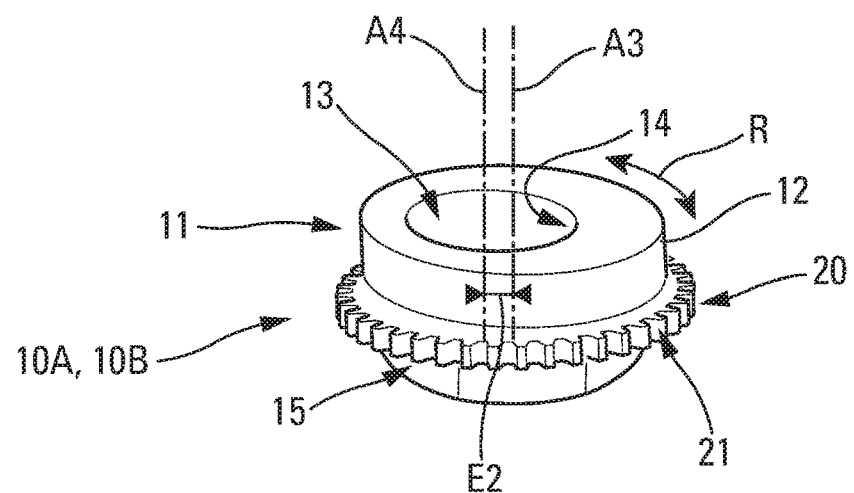
FIG. 4 is a view in perspective of an eccentric sleeve.

The connecting device 1 further comprises two eccentric sleeves 10A and 10B. As represented in FIG. 4, each eccentric sleeve 10A, 10B is a hollow cylinder. Each eccentric sleeve 10A, 10B comprises a cylindrical section 11 provided with an outer (or peripheral) cylindrical surface 12 and an inner cylindrical opening 13. The inner cylindrical opening 13 delimits an inner cylindrical surface 14.

In the context of the disclosure herein, the adjectives "inner" and "outer" are defined for a cylindrical section or a cylinder, radially with respect to the (central) axis of revolution of this cylindrical section or of this cylinder, respectively toward this axis of revolution (for "inner") and away from this axis of revolution (for "outer").

Each sleeve 10A, 10B is termed eccentric, since the outer cylindrical surface 12 and the inner cylindrical surface 14 have axes of revolution A3 and A4 which are also different, i.e. not coaxial, while being parallel to each other. In other words, the centers of the circular cross sections of the outer and inner cylindrical sections 12 and 14, are different, i.e. offset with respect to each other, as illustrated in FIG. 4 by a spacing (or offset) E2 (in a plane orthogonal to the parallel axes of revolution A3 and A4).

The cylindrical section 11 of the eccentric sleeve 10A is intended to be inserted into a circular hole of the mechanical component P1, namely in the circular hole T1A of the mechanical component P1 in the example of FIGS. 1 and 2, with the outer cylindrical surface 12 in contact with the inner surface S1A of the circular hole T1A.

Similarly, the cylindrical section 11 of the eccentric sleeve 10B is intended to be inserted into a circular hole of the mechanical component P1, namely in the circular hole T1B of the mechanical component P1 in the example of FIGS. 1 and 2, with the outer cylindrical surface 12 in contact the inner surface S1B of the circular hole T1B.

Moreover, the inner cylindrical openings 13 of the eccentric sleeves 10A and 10B are intended to receive, respectively, the cylindrical sections 3A and 3B of the eccentric pin 2. The eccentric sleeves 10A and 10B present substantially identical lengths. The eccentric sleeves 10A and 10B also present substantially identical diameters.

Thus, thanks to this eccentric pin 2 and these eccentric sleeves 10A and 10B (which are intended to be mounted on the eccentric pin 2) there is a triple eccentricity with a spacing E1 and two spacings E2 on the connecting device 1. There is thus an adjustable tolerance between the section 4 of the eccentric pin 2 (intended to be inserted into the circular hole T2 of the mechanical component P2) and the cylindrical sections 11 (with outer cylindrical surface 12) of the eccentric sleeves 10A and 10B (which are intended to be inserted, respectively, into the circular holes T1A and T1B of the mechanical component P1). This tolerance is adjustable by rotation of the eccentric sleeves 10A and 10B in one or the other direction (as illustrated by a double arrow R in FIG. 4) on the eccentric pin 2. Thus, by a suitable relative rotational positioning between the eccentric sleeves 10A and 10B and the eccentric pin 2, it is possible to compensate for any possible play between the three (superimposed) circular holes T1A, T1B and T2 of the mechanical components P1 and P2 to be linked together, thereby blocking the mechanical components P1 and P2 with respect to each other, in shear.

The connecting device 1 accordingly makes it possible to make a connection (or an assembly) which is able to compensate for any possible play (up to a few millimeters) due, notably, to an imperfect geometry of the circular holes T1A, T1B and T2 and/or to a misalignment of these circular holes T1A, T1B and T2 when they are superimposed, and this without having to perform adjustment operations or drillings, which makes it possible to obtain a clean connection and quickly perform the assembly.

When the appropriate rotational positioning (between the eccentric sleeves 10A and 10B and the eccentric pin 2) is obtained, the assembly is blocked against rotation.

To do so, the connecting device 1 comprises a blocking element 16 intended for rotationally blocking the eccentric sleeve 10A.

In a preferred embodiment, the blocking element 16 comprises, as represented in FIG. 2, a plate 17. This plate 17 comprises a circular opening 18 having a notched inner edge 19. In addition, the eccentric sleeve 10A comprises a peripheral ring 20 arranged between the cylindrical section 11 and an end section 15, as represented in FIG. 4. This peripheral ring 20 comprises a peripheral (or outer) notched edge 21 complementary in shape to the inner notched edge 19 of the circular opening 18.

For performing the blocking, the plate 17 is positioned so that the inner notched edge 19 of the circular opening 18 fits tightly around the complementarily shaped notched peripheral edge 21 of the peripheral ring 20 of the eccentric sleeve 10A. Then, the plate 17 is attached to the mechanical component P1, with the aid of conventional attachment means. In the example of FIGS. 1 and 2, the plate 17 is attached with the aid of a screw 22 having a threaded stem 23 and a head 24, which is screwed into a threaded drilling 25 engaging with the mechanical component P1. In addition, a washer 26 is arranged between the head 24 and the plate 17.

For performing the rotational blocking between the eccentric sleeves 10A and 10B and the eccentric pin 2, the connecting device 1 also comprises a blocking element 27 to rotationally block the eccentric sleeve 10B. The shape of the blocking element 27 is substantially identical to the shape of the blocking element 16.

In a preferred embodiment, the blocking element 27 comprises, as represented in FIG. 2, a plate 28. This plate 28 comprises a circular opening 29 having a notched inner edge 30. In addition, like the eccentric sleeve 10A, the eccentric sleeve 10B comprises the peripheral ring 20 arranged between the sections 11 and 15 as represented in FIG. 4. This peripheral ring 20 comprises the peripheral (or outer) notched edge 21 which is designed to be complementary in shape to the inner notched edge 30 of the circular opening 29.

For performing the blocking, the plate 28 is positioned so that the notched inner edge 30 of the circular opening 29 fits tightly around the complementarily shaped notched peripheral edge 21 of the peripheral ring 20 of the eccentric sleeve 10B. Then, the plate 28 is attached to the mechanical component P2, with the aid of conventional attachment means. In the example of FIGS. 1 and 2, the plate 28 is attached with the aid of a screw 33 having a threaded stem 34 and a head 35, which is screwed into a threaded drilling 36 engaging with the mechanical component P1. In addition, a washer 37 is arranged between the head 35 and the plate 28.

The plate 17 is screwed onto a face 31 (FIG. 1) of the mechanical component P1 and the plate 28 is screwed onto a face 32 opposite the face 31.

Figure 5:
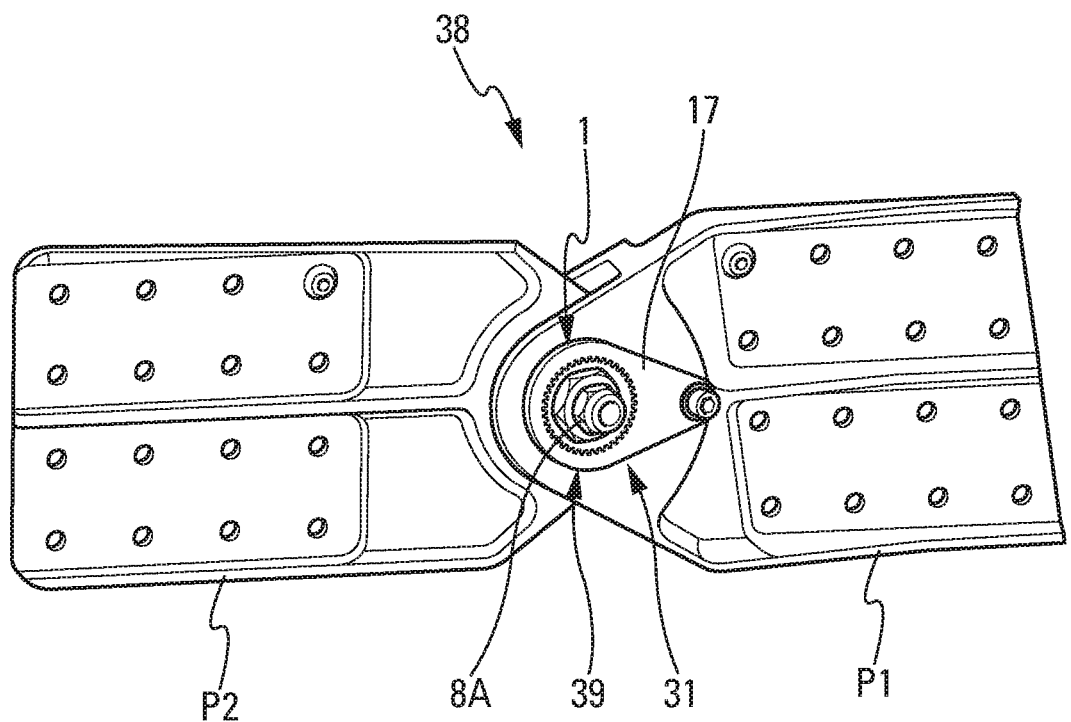
FIGS. 5 and 6 are views in perspective of a mechanical assembly comprising two partially superimposed mechanical components and a connecting device that links them together, looking respectively on each side of the connecting device.
Figure 6:
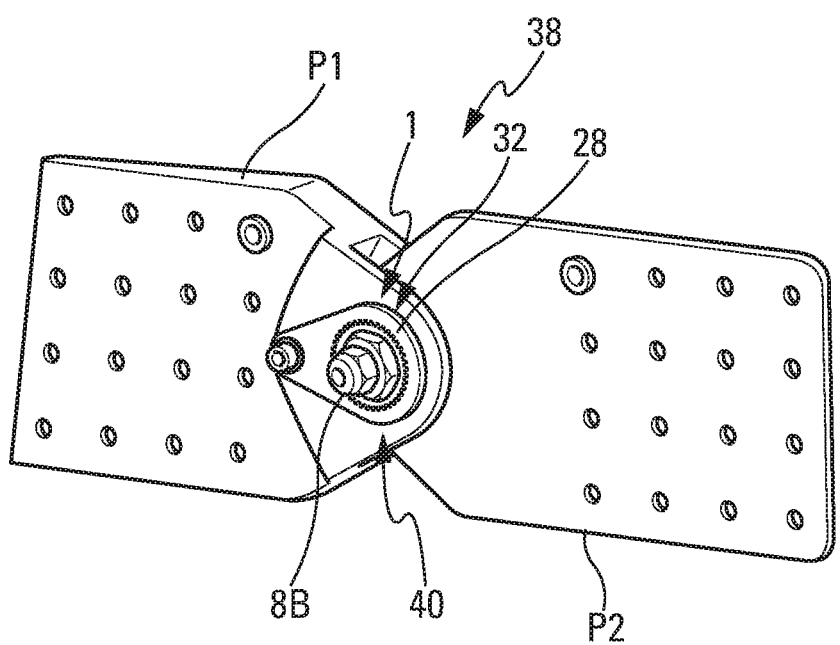

FIGS. 5 and 6 depict a mechanical assembly 38 illustrating the mechanical connection as produced. This mechanical assembly 38 comprises an assembly formed of the mechanical component P1, the mechanical component P2 and the connecting device 1 as described above, which links together these mechanical components P1 and P2. FIG. 5 illustrates the view of one side 39 of the mechanical assembly 38, notably depicting the plate 17 (on the face 31), and FIG. 6 illustrates the other side 40 of the mechanical assembly 38, notably depicting the plate 28 (on the face 32).

The connecting device 1 is a double-shear device, shear being the inner stress state of the mechanical assembly 38, wherein each of the mechanical components P1 and P2 has a tendency, under the effect of forces of opposite direction, to slide with respect to each other.

Figure 7:
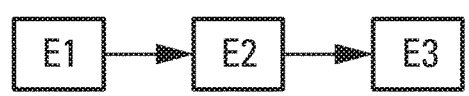
FIG. 7 schematically illustrates the main steps of a method of assembly of such a mechanical assembly.

The connecting device 1, as described above, is assembled with the two mechanical components P1 and P2 to form the mechanical assembly 38 of FIGS. 5 and 6, with the aid of a method of assembly represented in FIG. 7.

This method of assembly notably comprises the following steps:

a step E1 of bringing the end 6 (FIG. 2) of the mechanical component P2, provided with the circular hole T2 between the two arms F1 and F2 of the fork F of the mechanical component P1 so as to superimpose the circular holes T1A, T1B and T2;

a step E2 of inserting the eccentric pin 2 and the eccentric sleeves 10A and 10B into these superimposed circular holes T1A, T1B, and T2, the eccentric sleeves 10A and 10B surrounding the eccentric pin 2, to bring the eccentric sleeve 10A and the eccentric pin 2 into a first rotationally relative position, and to bring the eccentric sleeve 10B and the eccentric pin 2 into a second rotationally relative position, these first and second relative positions making it possible to compensate for any play, where appropriate; and a step E3 of rotationally blocking the eccentric sleeves 10A and 10B (and thus also the eccentric pin 2), with the aid of the blocking elements 16 and 27, and longitudinally securing the eccentric pin 2 (and thus also the eccentric sleeves 10A and 10B) by screwing the nuts 8A and 8B, respectively, onto the threaded stems 7A and 7B of the eccentric pin 2.

A preferred application of the connecting device 1 relates to attaching an assembly module on an aircraft, in particular on a transport plane, and notably attaching a floor module in the fuselage of the aircraft. For this purpose, the floor module may be fitted with water pipes, electrical wiring, ventilation ducts, floor panels, etc. In this case, the floor module is attached in the fuselage of the aircraft at a plurality of attachment points, at least some of which (and preferably all) use connecting devices 1 such as that described above. To do so, the fitted floor module is moved while being guided by detectors in the fuselage, and it is brought into its final position inside the fuselage. Then, it is attached to the fuselage at the plurality of attachment points.

In this application, at each attachment point comprising a mechanical assembly 38, the mechanical component P1 forms part of the fuselage or corresponds to a part attached to the fuselage and the mechanical component P2 forms part of the floor module or corresponds to a part attached to the floor module, or vice versa.

The connecting device 1, as described above, has many advantages. In particular, it makes it possible to obtain:

a connection capable of locally compensating for deviations in manufacturing and/or in alignment without having to perform adjustment operations;

a quick connection, since installing the connecting device 1 may be achieved quickly, since it notably does not require any adjustment operations or drillings; and a clean connection, since no drilling is necessary and the installation of the connecting device 1 does not generate any waste.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A connecting device to connect together two mechanical components, a first of the mechanical components comprising a fork having two branches, each of the branches comprising a circular hole, and a second of the mechanical components, comprising a circular hole, the device comprising at least:

an eccentric pin comprising at least first and second coaxial cylindrical sections having a first axis of revolution, and, between the first and second cylindrical sections, a third cylindrical section having a second axis of revolution, the first and second axes of revolution being different, the third cylindrical section configured to pass through the circular hole in the second mechanical component;

a first eccentric sleeve comprising at least one hollow cylinder comprising an outer cylindrical surface and with an inner cylindrical surface, the outer cylindrical surface configured to be inserted into the circular hole of a first of the branches of the fork and the inner cylindrical surface configured to accept the first cylindrical section of the eccentric pin, the outer and inner cylindrical surfaces of the first eccentric sleeve having different axes of revolution;

a second eccentric sleeve comprising at least one hollow cylinder comprising an outer cylindrical surface and with an inner cylindrical surface, the outer cylindrical surface being intended to be inserted in the circular hole of the second of the branches of the fork and the inner cylindrical surface being intended for receiving the second cylindrical section of the eccentric pin, the outer and inner cylindrical surfaces of the second eccentric sleeve having different axes of revolution; and a ball joint to be between the third cylindrical section and the circular hole of the second mechanical component.

2. The connecting device according to claim 1, comprising:

a first blocking element for rotationally blocking the first eccentric sleeve; and a second blocking element for rotationally blocking the second eccentric sleeve.

3. The connecting device according to claim 2, wherein the first blocking element comprises a first plate comprising, a circular opening with a notched inner edge, to grip a complementarily shaped notched peripheral edge of the first eccentric sleeve, the first plate being attachable to the first mechanical component.

4. The connecting device according to claim 2, wherein the second blocking element comprises a second plate comprising a circular opening with a notched inner edge to grip a complementarily shaped notched peripheral edge of the second eccentric sleeve, the second plate being attachable to the second mechanical component.

5. The connecting device according to claim 1, wherein the first, second, and third cylindrical sections are connected directly to one another longitudinally.

6. The connecting device according to claim 1, wherein the eccentric pin comprises, at each of its ends, a threaded section intended to receive a nut.

7. A mechanical assembly comprising:
a first mechanical component;
a second mechanical component; and
a connecting device according to claim 1, which connects the first and second mechanical components together.

8. The mechanical assembly according to claim 7, comprising:
a first blocking element for rotationally blocking the first eccentric sleeve; and
a second blocking element for rotationally blocking the second eccentric sleeve.

9. The mechanical assembly according to claim 8, wherein the first blocking element and the second blocking element are attached onto the first mechanical component.

10. A method for assembling two mechanical components together, the method comprising:
providing a first mechanical component comprising a fork having two branches, each of the branches comprising a circular hole; and
providing a second mechanical component comprising a circular hole; and
providing a connecting for connecting together the first and second mechanical components, the connecting device comprising at least:
an eccentric pin comprising at least first and second coaxial cylindrical sections having a first axis of revolution, and, between the first and second cylindrical sections, a third cylindrical section having a second axis of revolution, the first and second axes of revolution being different, the third cylindrical section configured to pass through the circular hole in the second mechanical component;
a first eccentric sleeve comprising at least one hollow cylinder comprising an outer cylindrical surface and with an inner cylindrical surface, the outer cylindrical surface configured to be inserted into the circular hole of a first of the branches of the fork and the inner cylindrical surface configured to accept the first cylindrical section of the eccentric pin, the outer and inner cylindrical surfaces of the first eccentric sleeve having different axes of revolution;
a second eccentric sleeve comprising at least one hollow cylinder comprising an outer cylindrical surface and with an inner cylindrical surface, the outer cylindrical surface being intended to be inserted in the circular hole of the second of the branches of the fork and the inner cylindrical surface being intended for receiving the second cylindrical section of the eccentric pin, the outer and inner cylindrical surfaces of the second eccentric sleeve having different axes of revolution; and
a ball joint to be between the third cylindrical section and the circular hole of the second mechanical component;
bringing the second mechanical component so that one end thereof, which end comprises the circular hole, is introduced between branches of the fork of the first mechanical component to superimpose the three circular holes;
inserting the eccentric pin and the eccentric sleeves in the superimposed circular holes and bringing them into rotationally relative positions that allow any play to be compensated for if appropriate; and
rotationally blocking the eccentric sleeves and the eccentric pin, using the blocking elements.

11. The method according to claim 10, comprising:
providing a first blocking element for rotationally blocking the first eccentric sleeve; and
providing a second blocking element for rotationally blocking the second eccentric sleeve.

12. The method according to claim 11, wherein the first blocking element comprises a first plate comprising a circular opening with a notched inner edge, to grip a complementarily shaped notched peripheral edge of the first eccentric sleeve, the first plate being attachable to the first mechanical component.

13. The method according to claim 11, wherein the second blocking element comprises a second plate comprising a circular opening with a notched inner edge to grip a complementarily shaped notched peripheral edge of the second eccentric sleeve, the second plate being attachable to the second mechanical component.

14. The method according to claim 10, wherein the first, second, and third cylindrical sections are connected directly to one another longitudinally.

15. The method according to claim 10, wherein the eccentric pin comprises, at each of its ends, a threaded section intended to receive a nut.

\* \* \* \* \*